(12) United States Patent
Lewin et al.

(10) Patent No.: US 10,173,082 B2
(45) Date of Patent: Jan. 8, 2019

(54) COMBINED EXHALE AND INLET VALVE FOR RESPIRATOR

(71) Applicant: Scott Health & Safety Limited, Lancashire (GB)

(72) Inventors: Barry Lewin, Merseyside (GB); Steven Thurgood, Liverpool (GB)

(73) Assignee: SCOTT HEALTH & SAFETY LTD. (GB)

( * ) Notice: Subject to any disclaimer, the term of this patent is extended or adjusted under 35 U.S.C. 154(b) by 535 days.

(21) Appl. No.: 14/854,250

(22) Filed: Sep. 15, 2015

(65) Prior Publication Data

US 2016/0001104 A1    Jan. 7, 2016

Related U.S. Application Data

(63) Continuation of application No. PCT/GB2014/050774, filed on Mar. 14, 2014.

(60) Provisional application No. 61/791,796, filed on Mar. 15, 2013.

(51) Int. Cl.
| | |
|---|---|
| *A62B 9/02* | (2006.01) |
| *F16K 17/02* | (2006.01) |
| *F16K 31/12* | (2006.01) |
| *A62B 18/10* | (2006.01) |

(52) U.S. Cl.
CPC ............... *A62B 9/02* (2013.01); *F16K 17/02* (2013.01); *F16K 31/12* (2013.01); *A62B 18/10* (2013.01)

(58) Field of Classification Search
CPC ........... A62B 9/02; A62B 18/10; F16K 17/02; F16K 31/12; A61M 16/20; A61M 16/201; A61M 16/208; A61M 16/209
See application file for complete search history.

(56) References Cited

U.S. PATENT DOCUMENTS

| | | |
|---|---|---|
| 2,820,469 A | 1/1958 | Seeler |
| 3,088,477 A | 5/1963 | Bloom |
| 3,519,012 A | 7/1970 | Van Patten |
| (Continued) | | |

OTHER PUBLICATIONS

International Preliminary Report on Patentability and Written Opinion of the International Searching Authority dated Sep. 24, 2015 for International Application Serial No. PCT/GB2014/050774, International Filing Date Mar. 14, 2014, consisting of 7-pages.

(Continued)

*Primary Examiner* — Steven Douglas
(74) *Attorney, Agent, or Firm* — Christopher & Weisberg, P.A.

(57) ABSTRACT

A valve assembly including a mask end and a supply end is provided. The valve assembly includes a housing assembly, an inhale valve, and an exhale valve. The housing assembly defines a first air passageway configured for inhalation and a second air passageway configured for exhalation. At least a portion of the second air passageway is disposed peripherally around the first air passageway. The inhale valve is configured to be biased to an open position when subject to a reduction in pressure due to inhalation, and to be biased to a closed position when subject to an increase in pressure proximate due to exhalation. The exhale valve is configured to be biased to a closed position when subject to a reduction in pressure due to inhalation, and to be biased to an open position when subject to an increase in pressure due to exhalation.

19 Claims, 5 Drawing Sheets

(56) References Cited

U.S. PATENT DOCUMENTS

| | | | |
|---|---|---|---|
| 3,524,464 A | 8/1970 | Glidden | |
| 5,002,050 A * | 3/1991 | McGinnis | A61M 16/208 128/204.18 |
| 6,997,206 B1 * | 2/2006 | Klockseth | A62B 18/10 128/205.24 |
| 2007/0012360 A1 * | 1/2007 | Flynn | A61M 16/06 137/102 |
| 2008/0223457 A1 * | 9/2008 | Kobziar | A62B 9/02 137/493 |
| 2013/0319420 A1 * | 12/2013 | Danford | A62B 18/10 128/206.21 |

OTHER PUBLICATIONS

International Search Report dated Jul. 7, 2014 for International Application Serial No. PCT/GB2014/050774, International Filing Date Mar. 14, 2014, consisting of 5-pages.

* cited by examiner

COMBINED EXHALE AND INLET VALVE FOR RESPIRATOR

CROSS-REFERENCE TO RELATED APPLICATIONS

This application is a continuation of International Patent Application No. PCT/GB2014/050774 filed Mar. 14, 2014, which claims the benefit of and priority to U.S. Provisional Application No. 61/791,796 filed Mar. 15, 2013, the contents of both of which are incorporated herein by reference.

The subject matter described herein relates generally to inhale and exhale valves for respirators, and particularly to combined inhale and exhale valve assemblies.

BACKGROUND OF THE DISCLOSURE

Conventional respirator assemblies may utilize a mask or face piece configured to fit over the head of a user and/or be worn by a user. Respirator assemblies may include a first opening that includes an inlet or inhale valve configured to allow air for breathing into the mask, and a second opening that includes an outlet or exhale valve configured to allow air to be exhaled by the user of the mask. Space on the mask for fittings or attachments is at a premium, for example, as increasing the space occupied by fittings or attachments adds to the complexity and cost of the mask, reduces the visibility to a wearer of the mask, and/or adds inconvenience to the use of the mask. Thus, the use of separate inhale valve and exhale valve devices and two fittings on the mask (one for an inhale valve device and one for an exhale valve device) takes up space on the mask. Some respirator assemblies use a single fitting on a mask for both inhalation and exhalation; however, conventional assemblies suffer from drawbacks, such as the amount of space occupied on the mask.

SUMMARY OF THE DISCLOSURE

In various embodiments, a valve assembly configured for securement to a mask is provided. The valve assembly includes a mask end configured to be oriented toward the mask and a supply end configured to be oriented toward a supply of air. The valve assembly includes a housing assembly, an inhale valve, and an exhale valve. The housing assembly defines a first air passageway and a second air passageway. The first air passageway is configured for flow therethrough of air for inhalation, and the second air passageway is configured for flow therethrough of exhaled air. At least a portion of the second air passageway is disposed peripherally around the first air passageway. The inhale valve is secured proximate to an interior portion of the housing assembly and is biasable between a closed and an open position. The inhale valve is configured to be biased to the open position and allow flow through the first air passageway when subject to a reduction in pressure proximate the mask end of the valve assembly due to inhalation, and to be biased to the closed position and inhibit flow through the first air passageway when subject to an increase in pressure proximate the mask end of the valve assembly due to exhalation. The exhale valve is secured peripherally around the interior portion of the housing assembly and is biasable between a closed and an open position. The exhale valve is configured to be biased to the closed position and inhibit flow through the second air passageway when subject to a reduction in pressure proximate the mask end of the valve assembly due to inhalation, and to be biased to the open position and allow flow through the second air passageway when subject to an increase in pressure proximate the mask end of the valve assembly due to exhalation.

In various embodiments, a respiration assembly is provided including a mask and a valve assembly. The mask is configured to be positioned about a head of an operator, and includes a breathing port. The valve assembly is configured for securement to the breathing port of the mask, and includes a mask end configured to be oriented toward the mask and a supply end configured to be oriented toward a supply of air. The valve assembly includes a housing assembly, an inhale valve, and an exhale valve. The housing assembly defines a first air passageway and a second air passageway. The first air passageway is configured for flow therethrough of air for inhalation, and the second air passageway is configured for flow therethrough of exhaled air. At least a portion of the second air passageway is disposed peripherally around the first air passageway. The inhale valve is secured proximate to an interior portion of the housing assembly and is biasable between a closed and an open position. The inhale valve is configured to be biased to the open position and allow flow through the first air passageway when subject to a reduction in pressure proximate the mask end of the valve assembly due to inhalation, and to be biased to the closed position and inhibit flow through the first air passageway when subject to an increase in pressure proximate the mask end of the valve assembly due to exhalation. The exhale valve is secured peripherally around the interior portion of the housing assembly and is biasable between a closed and an open position. The exhale valve is configured to be biased to the closed position and inhibit flow through the second air passageway when subject to a reduction in pressure proximate the mask end of the valve assembly due to inhalation, and to be biased to the open position and allow flow through the second air passageway when subject to an increase in pressure proximate the mask end of the valve assembly due to exhalation.

In various embodiments, a valve assembly configured for securement to a mask is provided. The valve assembly includes a mask end configured to be oriented toward the mask and a supply end configured to be oriented toward a supply of air. The valve assembly includes a housing assembly, an inhale valve, and an exhale valve. The housing assembly includes a first chamber, a second chamber, and a third chamber. The first chamber is disposed proximate the supply end of an interior of the housing assembly, the second chamber is disposed proximate the mask end of the interior of the housing, and the third chamber is disposed peripherally about at least one of at least a portion of the first chamber or at least a portion of the second chamber. The third chamber is in fluid communication with the second chamber. The inhale valve is interposed between the first chamber and the second chamber, and is biasable between a closed and an open position. The inhale valve is configured to be biased to the open position and allow flow from the first chamber to the second chamber when subject to a reduction in pressure proximate the mask end of the valve assembly due to inhalation, and to be biased to the closed position and inhibit flow from the second chamber to the first chamber when subject to an increase in pressure proximate the mask end of the valve assembly due to exhalation. The exhale valve is interposed between the third chamber and an exit region of the valve assembly, and is biasable between a closed and an open position. The exhale valve is configured to be biased to the closed position and inhibit flow between the third chamber and the exit region when subject to a reduction in pressure proximate the mask end of the valve assembly due to inhalation, and to be biased to the open position and allow flow from the third chamber to the exit region when subject to an increase in pressure proximate the mask end of the valve assembly due to exhalation.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION OF THE DISCLOSURE

Generally, in various embodiments, a valve assembly is provided that includes a first passageway configured for inhalation and a second passageway configured for exhalation. The second passageway in various embodiments is disposed peripherally around the first passageway. In various embodiments, at least a portion of the second passageway laterally surrounds the first passageway. For example, the second passageway may include a ring shaped portion that encircles the first portion. A technical effect of various embodiments includes the provision of inhalation and exhalation capabilities while utilizing only a single port of a mask or face piece. A technical effect of various embodiments includes reduction in the space occupied by components for inhalation and exhalation. A technical effect of various embodiments includes reduction in the cost of parts, materials, manufacturing, assembly, maintenance, and/or repair of inhalation and exhalation valves. A technical effect of various embodiments includes improvement of visibility for respirator masks.

Figure 1:
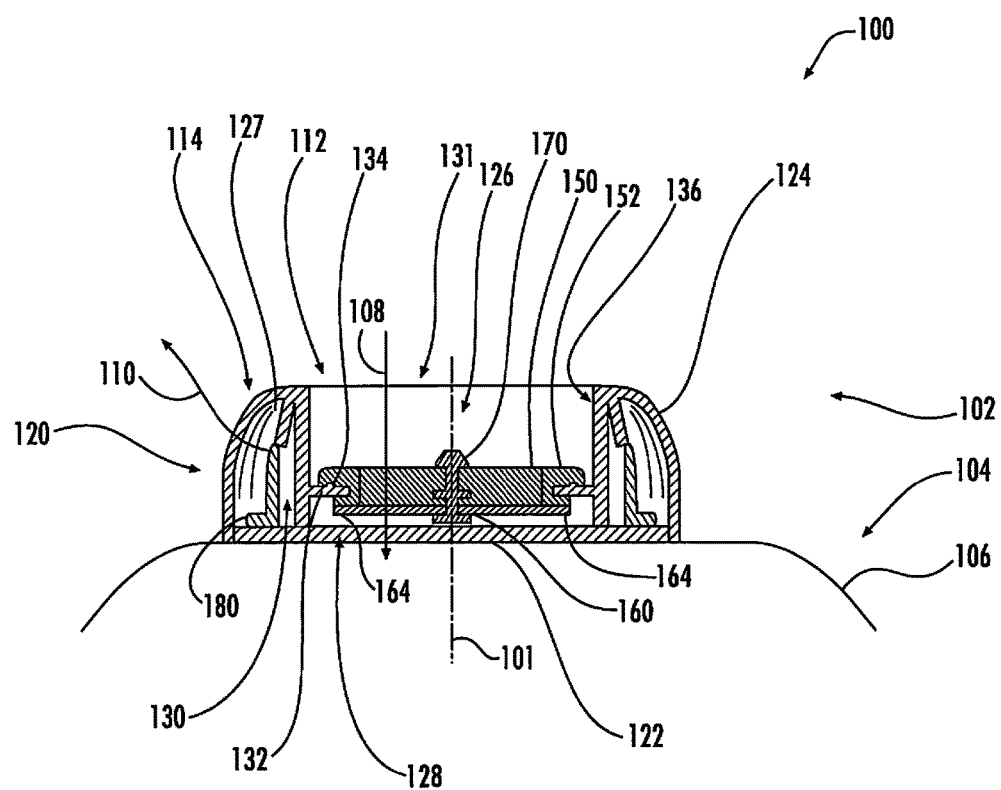
FIG. 1 is a side sectional view of a valve assembly formed in accordance with various embodiments.
Figure 2:
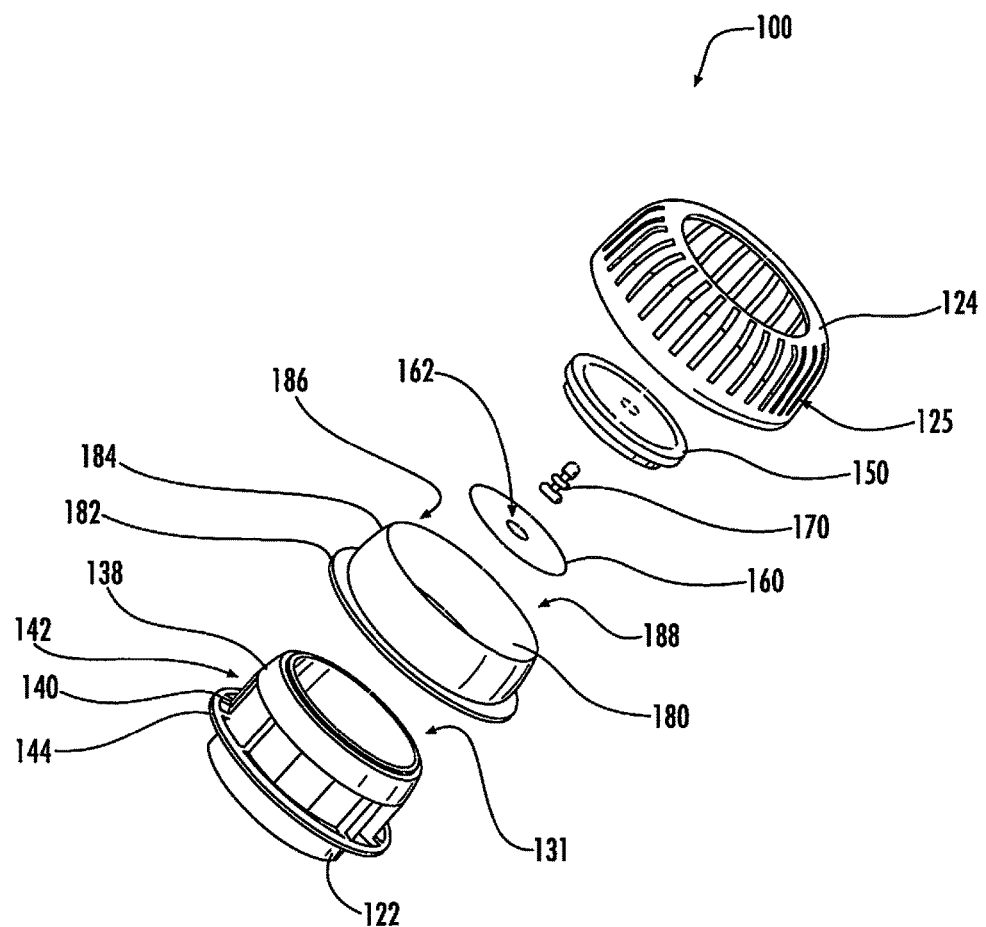
FIG. 2 is an exploded view of the valve assembly of FIG. 1.

FIG. 1 provides a sectional view of a valve assembly 100 formed in accordance with various embodiments, and FIG. 2 provides an exploded view of the valve assembly 100. The depicted valve assembly 100 is configured for attachment or securement to a mask 106 or face piece configured to be secured about the head of an operator and worn by the operator. The valve assembly 100 includes a supply side 102 configured for attachment to an air supply source (e.g., a filter, or a demand valve operably connected to a supply tank, among others). The valve assembly also includes a mask end 104 configured for attachment to the mask 106. The mask end 104, for example, may include a threaded attachment and one or more seals configured for mounting to a port of the mask 106. Air is supplied to the operator via the mask 106. For example, in some embodiments, the air is supplied via positive pressure operation, for example as part of a self-contained breathing apparatus (SCBA), where the air is supplied from a source such as a tank and the interior of the mask 106 is generally maintained at a positive pressure. In other embodiments, the air is supplied via negative pressure operation, for example via inhalation by the operator through a filter affixed to the valve assembly 100. The valve assembly 100 depicted in FIG. 1 is generally circularly shaped in cross section and disposed about a central axis 101. In negative pressure operation, a wearer is relied upon to provide a negative pressure inside the mask as the wearer inhales, drawing air into the mask (e.g, via a filter canister). In positive pressure operation, pressure within the mask remains positive and is provided, for example, from an air cylinder worn by the wearer of the mask.

The depicted valve assembly 100 includes a housing assembly 120, an inhale valve housing 150, an inhale valve 160, a pin 170, and an exhale valve 180. The housing assembly includes a housing 122 and a cap 124. Generally, in various embodiments, air to be provided to the mask 106 for inhalation is provided via an inhalation flow 108 passing through a first passageway 112. Exhaled air is expelled from the mask through the valve assembly 100 as an exhalation flow 110 passing through a second passageway 114. The valve assembly 100 thus includes both an inhalation passageway (first passageway 112) and an exhalation passageway (second passageway 114), allowing for both exhalation and inhalation to be provided via a single fitting with the mask 106.

The inhale valve 160 is disposed along the first passageway 112, and the exhale valve 180 is disposed along the second passageway 114. The inhale valve 160 is configured to open to allow air for inhalation to pass from the supply end 102 to the mask end 104 of the valve assembly, and to close to prevent the passage of air from the mask end 104 to the supply end 102 during exhalation or other non-inhalation periods of a respiratory cycle. The exhale valve 180 is configured to open to allow air to pass from the mask end 104 to an environment external to the valve assembly 100, (e.g., the atmosphere) during exhalation, and to close to prevent the entry of air from external to the valve assembly 100 (e.g., the atmosphere) via the second passageway 114 during inhalation or other non-exhalation periods of a respiratory cycle. In the illustrated embodiment, the first passageway 112 passes through a central interior portion 133 of the valve assembly, and at least a portion of the second passageway 114 includes a pathway that is ring-shaped or annular and disposed peripherally about the central interior portion 133 and the first passageway 112. In the illustrated embodiment, the first passageway 112 has a generally circular cross-section centered around the central axis 101, and the second passageway includes a generally ring-shaped cross-section centered around the central axis 101. Thus, the illustrated first passageway 112 and second passageway 114 disposed concentrically about a common axis, or are co-axial.

As indicated above, generally, in various embodiments, air is inhaled through the first passageway 112 and exhaled through the second passageway 114. In the illustrated embodiment, the inhale valve 160 is secured proximate to the interior portion 133 of the housing assembly 120 and biasable between a closed and an open position. The inhale valve 160 is configured to be biased to the open position and allow flow through the first air passageway 112 when the inhale valve 160 is subjected to a reduction in pressure proximate the mask end 104 of the valve assembly 100. For example, the inhale valve 160 may be sized and configured to be biased to the open position due to a suction pressure or force from inhalation by an operator wearing the mask 106. The inhale valve 160 is configured to be biased to the closed position and inhibit flow through the first air passageway 112 when subjected to an increase in pressure proximate the mask end 104 of the valve assembly 100, for example due to exhalation. The inhale valve 160 may also be configured to be in the closed position in the absence of a substantial or measurable pressure, so that the inhale valve 160 is in the closed position during additional periods of a respiratory or breathing cycle, for example when an operator is in a state of breath holding.

In the illustrated embodiment, the exhale valve 180 is secured peripherally around the interior portion 133 of the housing assembly 120. For example, the exhale valve 180 may be interposed radially, peripherally, or laterally between the housing 122 and the cap 124. The exhale valve 180 in the illustrated embodiment is biasable between a closed and an open position. The depicted exhale valve 180 is configured to be biased to the closed position and inhibit flow through the second air passageway 114 when the exhale valve 180 is subjected to a reduction in pressure or a suction force proximate the mask end 104 of the valve assembly 100 (e.g., due to inhalation). Also, the exhale valve 180 is configured to be biased to the open position and allow flow through the second air passageway 114 when subjected to an increase in pressure proximate the mask end 104 of the valve assembly 100 (e.g., due to exhalation).

In various embodiments, the first passageway 112 and/or the second passageway 114 may include or be defined by one or more chambers or cavities. Further, in some embodiments, a portion of the first passageway 112 and a portion of the second passageway 114 may share a common chamber or cavity. In the illustrated embodiment, the housing assembly 120 includes a first chamber 126, a second chamber 128, and a third chamber 130. An opening 131 passes through the interior portion 133 of the valve assembly 120, with the first chamber 126 disposed proximal the supply end 102 of the opening and the second chamber 128 disposed proximate the mask end 104 of the opening 131. In the illustrated embodiment, the inhale valve 160 is interposed between the first chamber 126 and the second chamber 128. Further, the third chamber 132 is disposed peripherally about the interior portion 133, the first chamber 126, and the second chamber 128. The inhale valve 160 is interposed between the first chamber 126 and the second chamber 128. The inhale valve 160 is configured to be biased to the open position and allow flow from the first chamber 126 to the second chamber 128 when the inhale valve 160 is subjected to a reduction in pressure proximate the mask end 104 of the valve assembly 100 (e.g., due to inhalation), and to be biased to the closed position and inhibit flow from the second chamber 128 to the first chamber 126 when subjected to an increase in pressure proximate the mask end 104 of the valve assembly 100 (e.g., due to exhalation).

The exhale valve 180 is configured to be biased to the closed position and inhibit flow from outside of the valve assembly 100 into the third chamber 130 and through to the second chamber 128 when the exhale valve 180 is subjected to a reduction in pressure proximate the mask end 104 of the valve assembly 100 (e.g., due to inhalation). Further the exhale valve 180 is configured to be biased to the open position and allow flow from the second chamber 128 to the third chamber 130 and out of the valve assembly 100 when subjected to an increase in pressure proximate the mask end 104 of the valve assembly 100 (e.g., due to exhalation).

Thus, in the illustrated embodiment, the first chamber 126 and the second chamber 128 cooperate to form the first passageway 112 for the inhalation flow 108. Similarly, the second chamber 128 and the third chamber 130 cooperate to form the second passageway 114 for the exhalation flow 110. The inhale valve 160 is disposed along the first passageway 114 and acts to control the passage of the flow of air through the first passageway 112. The exhale valve 180 is disposed along the second passageway 114 and acts to control the passage of the flow of air through the second passageway 114 (e.g., flow through the third chamber 130 and out of the valve assembly 100).

In the illustrated embodiment, the housing 122 accepts the cap 124 to form the housing assembly 120. The housing 122 may be molded or otherwise made, for example, from a generally rigid or inflexible material such as nylon. The materials used for the housing 122 (as well as other components of the valve assembly 100) may be selected for appropriate use in potentially hazardous or contaminated environments. The housing 122 in the illustrated embodiment is generally cylindrically shaped about the central axis 101 and the opening 131. The opening 131 extends through a length of the housing 122 in the illustrated embodiment. The housing 122 includes a shelf 132, a protrusion 134, a fitment surface 136, a sealing surface 138, legs 140, openings 141, a recessed surface 142 (see FIG. 2), and a ring 144.

As best seen in FIG. 1 (see also FIG. 3), the shelf 132 is a generally ring shaped structure extending radially inwardly from an interior wall of the opening 131. The shelf 132 is configured to secure and support the inhale valve housing 150, and to provide support to the inhale valve 160 and prevent biasing of the inhale valve 160 during exhalation. The shelf 132 in the depicted embodiment is interposed between the first chamber 126 and the second chamber 130. The shelf 132 includes a protrusion 134. In the illustrated embodiment, the protrusion 134 is configured as an annular bead extending radially around an upper surface of the shelf 132. The protrusion 134 is configured to cooperate with the inhale valve housing 150 to provide a seal between the shelf 132 and the inhale valve housing, to help prevent any undesired leakage of air around the edges of the inhale valve housing 132 between the first chamber 126 and the second chamber 128.

The fitment surface 136 is disposed along the interior of the opening 131 of the housing 122 proximate to the supply end 102. The fitment surface 126 is configured to provide an airtight fitting between the housing 122 and a device configured for the supply of air to the valve assembly 100. For example, for negative pressure operation, the fitment surface 126 may be configured to accept a filter configured to remove unwanted impurities from air being exhaled through the valve assembly 100. As another example, for positive pressure operation, the fitment surface 136 may be configured to accept a demand valve or other component or aspect of an a positive pressure air supply system. In alternate embodiments, the fitment surface 136 may be configured as a portion of the cap 124. For example, a first cap may be configured for positive pressure operation and a second cap may be configured for negative pressure operation. The caps may be interchangeable, with the appropriate cap selected based on the mode of operation (e.g., positive or negative pressure).

The sealing surface 138 is formed on an external surface of the housing 122 proximate to the supply end 102 in the illustrated embodiment. The sealing surface 138 is sized and configured so that the exhale valve 180 fits snugly against the sealing surface 138 and prevents or inhibits the flow of air between the exhale valve 180 and the sealing surface 138 in the absence of a pressure associated with or corresponding to exhalation. The recessed surface 132 extends radially inwardly relative to the sealing surface and is disposed between the sealing surface 138 and the bottom of the housing 122. The recessed surface is sized, positioned and configured to provide a space or gap between the interior of the exhale valve 180 and the housing 122, allowing air passing through the openings 141 to accumulate and exert pressure against the interior of the exhale valve 180 during exhalation to bias the exhale valve 180 to the open position.

Figure 3:
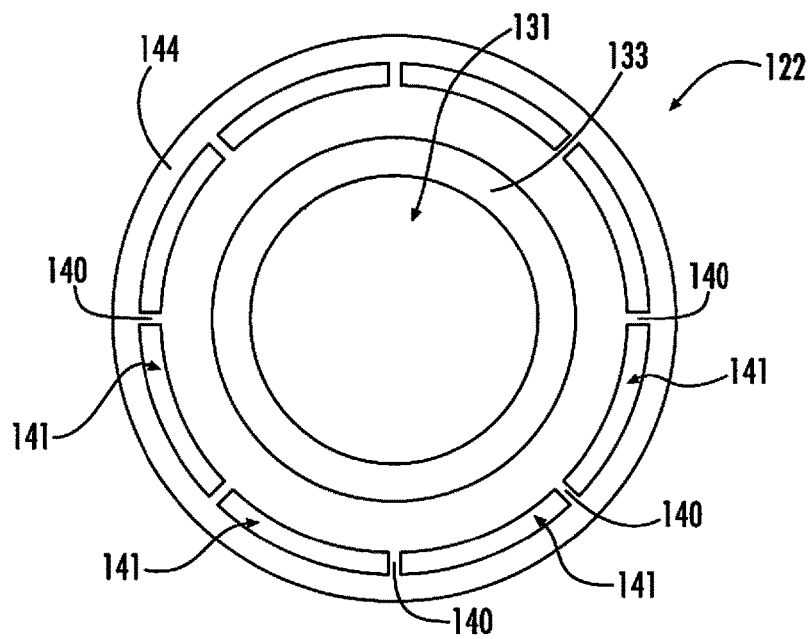
FIG. 3 is a top view of a housing for the valve assembly of FIG. 1.

FIG. 3 provides a top view of the housing 122. As seen in FIG. 3 and discussed above, the housing 122 is generally cylindrical and includes a generally circular opening 131 extending therethrough. The circular cross-section of the opening 131 does not have a constant radius, as the shelf 132 protrudes radially inward into the opening 131 and interior portion 133. The legs 140 extend externally (e.g., radially outward) from an interior or central region of the housing 122 to the ring 144 that encircles the interior or central region of the housing 122. In the illustrated embodiment, the ring 144 provides a surface for locating and/or supporting the bottom of the exhale valve 180. The openings 141 are disposed radially inward from the ring 144 and interposed between the legs 140. The second chamber 128 and the third chamber 130 are in fluid communication with each other via the openings 141. The openings 141 are configured to allow the passage of air exhaled by an operator or wearer of the mask 106 through the second passageway 114. For example, air exhaled by the operator may pass through the openings 141 and impinge against an interior surface of the exhale valve 180, acting to bias the exhale valve 180, thereby allowing the exhaled air to pass out of the valve assembly 100 to the atmosphere. In the illustrated embodiment, the second chamber 130 may be understood as being the region above the openings 141 and interposed between the housing 122 and the cap 124 (e.g. between the recessed surface 142 and the cap 124).

The depicted cap 124 is configured to secure to the housing 122 and, with the housing 122, to form the housing assembly 120. The third chamber 130 in the illustrated embodiment is interposed between the housing 122 and the cap 124. In various embodiments, the cap 124 may be molded or otherwise formed from a generally rigid material such as vinyl. The cap 124 may be threadedly, snappably, or otherwise secured to the housing 122. In some embodiments, the cap 124 may be releasably securable to the housing 122, allowing for the removal or replacement of the exhale valve 180 and/or interchangeability of different caps 124 (e.g., a first cap configured for positive pressure operation and a second cap configured for negative pressure operation). The depicted cap 124 includes openings 125 disposed circumferentially about an exterior of the cap 124. The openings 125 are configured to provide passage of air from the third chamber 130 to a region external to the valve assembly 100 (e.g., the atmosphere). Thus, exhaled air passing by the exhale valve 180 when the exhale valve 180 is biased to the open position may pass through the openings 125 and out of the valve assembly 100. Further, in various embodiments, the cap 124 may include a deflector surface 127. The deflector surface 127 may be positioned proximate to the supply end 102, and extend circumferentially around the cap 124. The deflector surface 127 may be configured to deflect, steer, or otherwise direct air radially outwardly away from an inhalation stream, for example, away from the periphery of a filter attached to the valve assembly 100 to prevent or inhibit the inhalation of air from the exhalation flow 110. In alternate embodiments, the deflector surface 127 may additionally or alternatively be configured as a part of the housing 122.

The inhale valve housing 150 of the illustrated embodiment is configured to locate, position, and support the inhale valve 160. The depicted inhale valve housing 150 is configured to be secured to the shelf 132 of the housing 122, and to be interposed between the first chamber 126 and the second chamber 128. In the illustrated embodiment, the inhale valve housing 150 may be molded or otherwise formed from a generally biasable or flexible material such as silicone rubber. The material may be selected and the inhale valve housing 150 sized and configured to provide sufficient flexibility and resiliency so that the inhale valve housing 150 may be snappably secured to the shelf 132.

The depicted inhale valve housing 150 includes a flange 152, openings 154, legs 155, and a pin opening 156. The flange 152 of the inhale valve housing 150 in the illustrated embodiment forms a generally ring shaped cavity encircling the inhale valve housing 150 sized to accept the shelf 132. The flange 152 may also include an inner surface of the cavity that resiliently cooperates with the protrusion 134 of the shelf 132 to form a seal between the flange 152 and the shelf 132.

Figure 4:
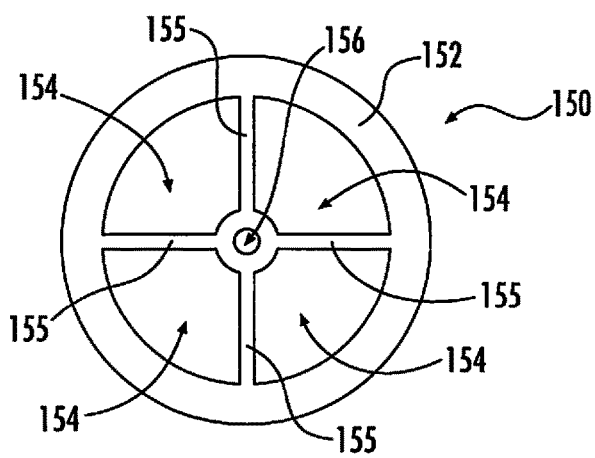
FIG. 4 is a top view of an inhale valve housing for the valve assembly of FIG. 1.

FIG. 4 provides a top view of the inhale valve housing 150 depicted in FIGS. 1 and 2. As best seen in FIG. 4, the pin opening 156 is centrally located (e.g., along the central axis 101). The pin opening 156 is configured to accept the pin 170 which is used to secure the inhale valve 160 to the inhale valve housing 150. The legs 155 extend radially outward from the center of the inhale valve housing 150 to the flange 152, and the openings 154 are interposed between the legs 155. The openings 154 are configured to allow the passage of air from the first chamber 126 to the second chamber 128 when the inhale valve 160 is in the open position. Thus, the inhalation flow 108 may pass from the supply end 102 toward the mask end 104 through the first chamber 126, and subsequently through the openings 155 and past the inhale valve 160 when the inhale valve 160 is in the open position (see FIG. 6), allowing the passage of the inhalation flow 108 from the first chamber 128 to the second chamber 130 and into the mask 106 for inhalation by an operator or wearer of the mask 106.

Figure 5:
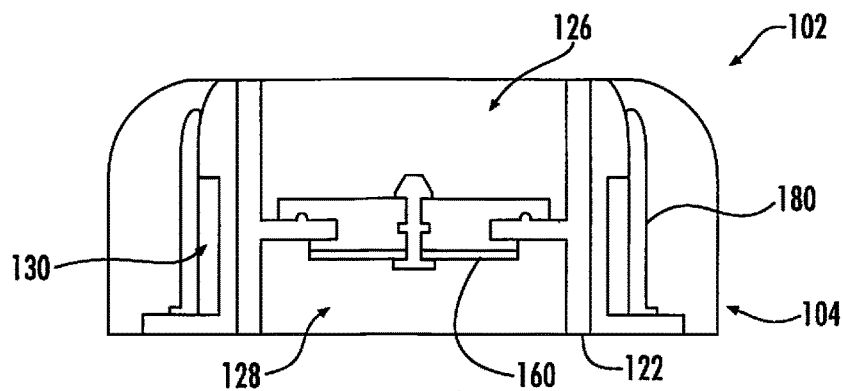
FIG. 5 is a side sectional view of the valve assembly of FIG. 1 with the inhale valve and exhale valve in respective closed positions.
Figure 6:
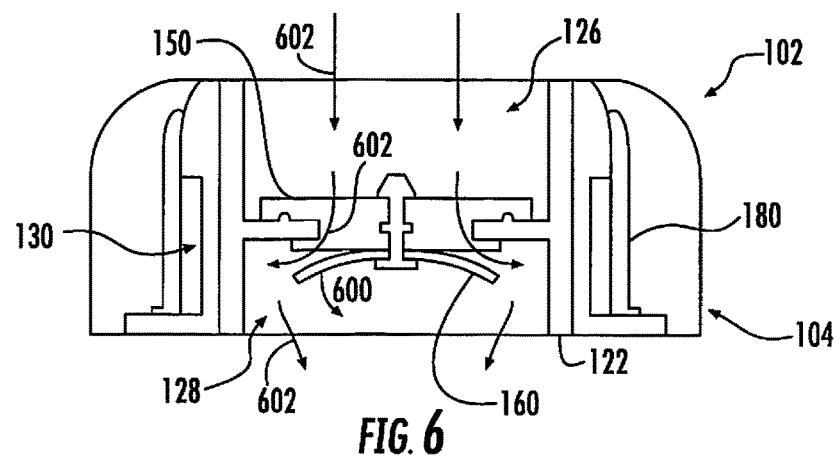
FIG. 6 is a side sectional view of the valve assembly of FIG. 1 with the inhale valve in an open position and the exhale valve in a closed position.
Figure 7:
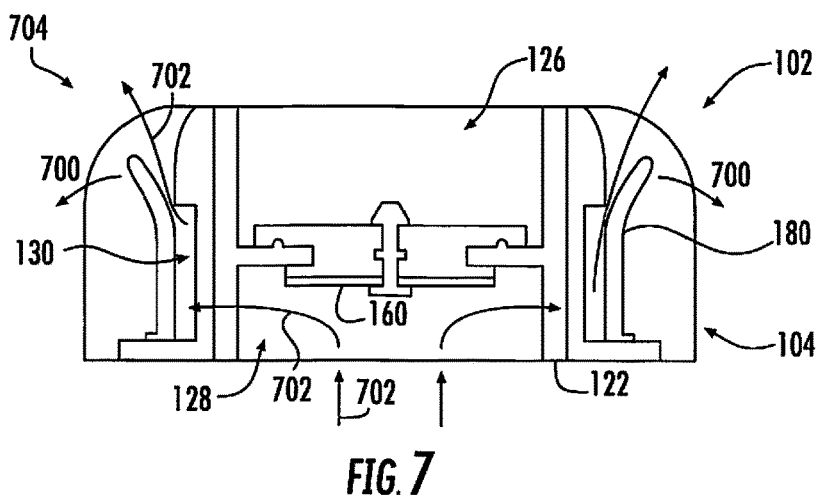
FIG. 7 is a side sectional view of the valve assembly of Figure with inhale valve in a closed position and the exhale valve in an open position.

Returning to FIGS. 1 and 2, the inhale valve 160 is interposed between the first chamber 126 and the second chamber 128 and is configured to control flow between the first chamber 126 and the second chamber 128. The inhale valve 160 is biasable between a closed position (as seen in FIGS. 1, 5, and 7) at which flow between the first chamber 126 and the second chamber 128 is inhibited or prevented, and an open position (as seen in FIG. 6) at which flow between the first chamber 126 and the second chamber 128 is permitted. In the illustrated embodiment, the inhale valve 160 is configured as or includes a flap that is biasable by pressures or forces encountered by the inhale valve 160. The inhale valve 160 may be made of a flexible, resilient material such as silicone rubber, and be sized and configured to be biasable to the open position by a pressure or force corresponding to inhalation by a user of the mask 104.

For example, the depicted inhale valve 160 is generally disc or circularly shaped, and includes a pin opening 162 disposed centrally through the inhale valve 160. The pin opening 162 is configured to accept the pin 170 which is used to secure the inhale valve 160 to the inhale valve housing 150, with the inhale valve 160 interposed between the inhale valve housing 150 and the mask end 104 (e.g., below the inhale valve housing 150 as seen in FIG. 1). When an exhalation flow encounters the inhale valve 160, an outer portion 164 of the inhale valve 160 is urged against the flange 152 of the inhale valve housing 150, which in turn is urged against the shelf 132 of the housing, which provides support and prevents the inhale valve 164 from biasing open. However, when a suction force and/or inhalation flow encounters the inhale valve 160, the outer portion 164 of the inhale valve 160 resiliently flexes downward to an open position, allowing flow from the first chamber 126 to the second chamber 128. When the suction and/or inhalation flow is removed or drops below a threshold value, the resilience of the inhale valve 160 returns the inhale valve 160 to the original or closed position. The inhale valve 160 is sized and configured to remain in the closed position absent a sufficient suction force corresponding to inhalation and/or force from an inhalation flow.

As seen in FIGS. 1 and 2, the exhale valve 180 of the illustrated embodiment is generally configured as a truncated cone, or frustoconical shape, configured to surround an exterior surface of the housing 122. The interior of the exhale valve 180 is configured to snugly fit against the sealing surface 138 of the housing. For example, an interference fit may be provided between an interior surface of the exhale valve 180 and the sealing surface 138 of the housing 122 such that the resiliency of the exhale valve 180 urges the interior of the exhale valve 180 against the sealing surface 138 and resists opening of the exhale valve (e.g., resists biasing of an upper portion of the exhale valve outward away from the sealing surface 138). The exhale valve 180 is interposed between the third chamber 130 and an exit region of the valve assembly (e.g., the openings 125 of the cap 124). The exhale valve is sized and configured to be biased to an open position and to allow passage of air from the third chamber 130 to outside of the valve assembly 100 during exhalation, and to return to the closed position, inhibiting flow between the third chamber 130 and outside of the valve assembly 100 when the user of the mask 104 is not exhaling. It may be noted that, due to the presence of a positive pressure in the mask acting to urge the exhale valve 180 open, the exhale valve may be configured to be thicker or otherwise more rigid when configured for use with positive pressure operation compared to negative pressure applications. In some embodiments, interchangeable exhale valves 180 may be employed. For example, a first exhale valve configured for positive pressure may be used for positive pressure operation, while a second exhale valve configured for negative pressure may be used for negative pressure operation. For instance, when switching modes of operation, the cap 124 may be removed from the housing 122, the exhale valve 180 replaced as appropriate, and the cap 124 replaced and secured to the housing 122.

In the illustrated embodiment, the exhale valve 180 is configured as or includes a flap that is biasable by pressures or forces encountered by the exhale valve 180. The exhale valve 180 may be made of a flexible, resilient material such as silicone rubber, and be sized and configured to be biasable to the open position by a pressure or force corresponding to exhalation by a user of the mask 104. The depicted exhale valve 180 includes a bottom 182, a top 184, an interior surface 186, and an opening 188. The opening 188 extends from the bottom to the top and is configured to provide a snug (e.g., interference) fit between a portion of the interior surface 186 proximate the top 184 and the sealing surface 138 when the exhale valve is mounted to the exterior of the housing 122. The material and dimensions of the exhale valve 180 are selected so that the top 184 of the exhale valve 180 is biased outward to an open position when subjected to a pressure or force corresponding to exhalation by a wearer of the mask 104.

FIG. 5 illustrates a side sectional view of the valve assembly 100 of FIGS. 1 and 2 with the inhale valve 160 and the exhale valve 180 both in their respective closed positions. Thus, in the state, orientation, or mode depicted in FIG. 5, air is prevented or inhibited from flowing from the supply end 102 to the mask end 104 as well as prevented or inhibited from flowing from the mask end 104 outside of the valve assembly 100. In the closed position, the inhale valve 160 acts to prevent or inhibit flow between the first chamber 126 and the second chamber 128. Also, the exhale valve 180 in the closed position acts to prevent or inhibit flow between the third chamber 130 and the atmosphere or environment surrounding the valve assembly 100. The exhale valve 180 and the inhale valve 160 are configured to remain in the closed position absent the exertion of a designed or otherwise predetermined pressure configured to bias one of the valves to an open position. For example, the exhale valve is configured to sealingly press against the sealing surface 138 of the housing 122 until a pressure associated with exhalation is exerted against the interior surface 186 of the exhale valve 180.

FIG. 6 illustrates a side sectional view of the valve assembly 100 of FIGS. 1 and 2 with the inhale valve 160 in the open position and the exhale valve 180 in the closed position. In this state, orientation, or mode, the inhalation flow 108 (see FIG. 1) is allowed to pass from the supply end 102 to the mask end 104, but the exhalation flow 110 (see FIG. 1) is inhibited from passing through the second passageway 114 and out of the valve assembly 100.

In FIG. 6, inhalation by the operator creates a suction or relative negative pressure on the surface of the inhale valve 160 oriented to the mask end 104. The resulting force biases the outer edge of the inhale valve 160 in a downward direction 600 (away from the shelf 132 of the housing 122 and the inhale valve housing 150), creating an opening between the inhale valve 160 and the inhale valve housing 150 and allowing the inhalation flow 602 to pass from the first chamber 126 to the second chamber 128. The inhale valve 160 thus bends along or parallel to a central longitudinal axis passing along the length of the housing 122 (e.g., the central axis 131). The exhale valve 180 remains in the closed position, as the exhale valve is configured to press snugly against the sealing surface 138 (see FIG. 2) in the absence of a sufficient force to bias the exhale valve 180 open. Any suction force acting on the exhale valve 180 (e.g., via the openings 141) acts to draw the exhale valve 180 further against the sealing surface 138 of the housing 122, thereby preventing or inhibiting any inhalation from the atmosphere or other source that has not passed through the supply end 102 and the first chamber 126. Once inhalation is complete, the resiliency of the inhale valve 160 acts to return the inhale valve 160 to the original, or closed, position, inhibiting flow between the first chamber 126 and the second chamber 128 (e.g., during breath holding and/or exhalation).

FIG. 7 illustrates a side sectional view of the valve assembly 100 of FIGS. 1 and 2 with the inhale valve 160 in the closed position and the exhale valve 180 in the open position. In this state, orientation, or mode, the inhalation flow 108 (see FIG. 1) is inhibited from passing between the mask end 102 and the supply end 104, but the exhalation flow 110 (see FIG. 1) is allowed to pass through the second passageway 114 and out of the valve assembly 100 (e.g., air flowing from the second chamber 128 to the third chamber 130 via the openings 141 of the housing 122 (see FIGS. 1, 2, and 3) is allowed to flow from the third chamber 130 out of the valve assembly 100).

As seen in FIG. 7, exhalation by the operator results in an exhalation flow 702 passing generally upward from the mask end 104 of the valve assembly. As the exhalation flow 702 passes upward from the second chamber 128 toward the first chamber 130, the exhalation flow encounters the inhale valve 160, which is configured to be in the closed position (e.g., against the shelf 132) in the absence of an inhalation suction force. The exhalation flow 702 acts to further urge the inhale valve 160 against the shelf 132 (via the flange 152 of the inhale valve housing 150) and thus acting to maintain the inhale valve 160 in the closed position, and preventing or inhibiting passage of the exhalation flow 702 from the second chamber 128 to the first chamber 126. Instead the exhalation flow is directed laterally or radially outward, through the openings 141 (see FIG. 2) of the housing 122 and into the third chamber 130. The exhalation flow 702 passes upward through the third chamber 130 until the exhalation flow 702 encounters the exhale valve 180. The exhalation flow 702 urges the top of the exhale valve 180 to bias in an outward direction 700, allowing the exhalation flow 702 to pass through the openings 125 (see FIG. 2) of the cap 124 and out of the valve assembly 100 into the atmosphere or surrounding environment. The exhale valve 180 thus bends in a direction that is generally transverse to a central longitudinal axis passing along the length of the housing 122 (e.g., the central axis 131). As seen in FIG. 7, the exhalation flow passes out of the valve assembly 100 at an air flow exit region 704 generally configured as a ring surrounding an upper edge of valve assembly 100. In various embodiments, deflector plates or members may be employed to direct flow out of the valve assembly 100 in a desired direction (e.g., away from an inhalation path configured to enter the first chamber 126). Once exhalation is complete, the exhale flow 702 no longer presses against the interior of the exhale valve 180 with a sufficient force to open the exhale valve 180, and the resiliency of the exhale valve 180 returns the exhale valve 180 to the original or closed position, with the exhale valve 180 snugly urged against the sealing surface 138, thereby sealing the interior of the valve assembly 100 from air flow into the valve assembly 100 via the air flow exit region 704.

Figure 8:
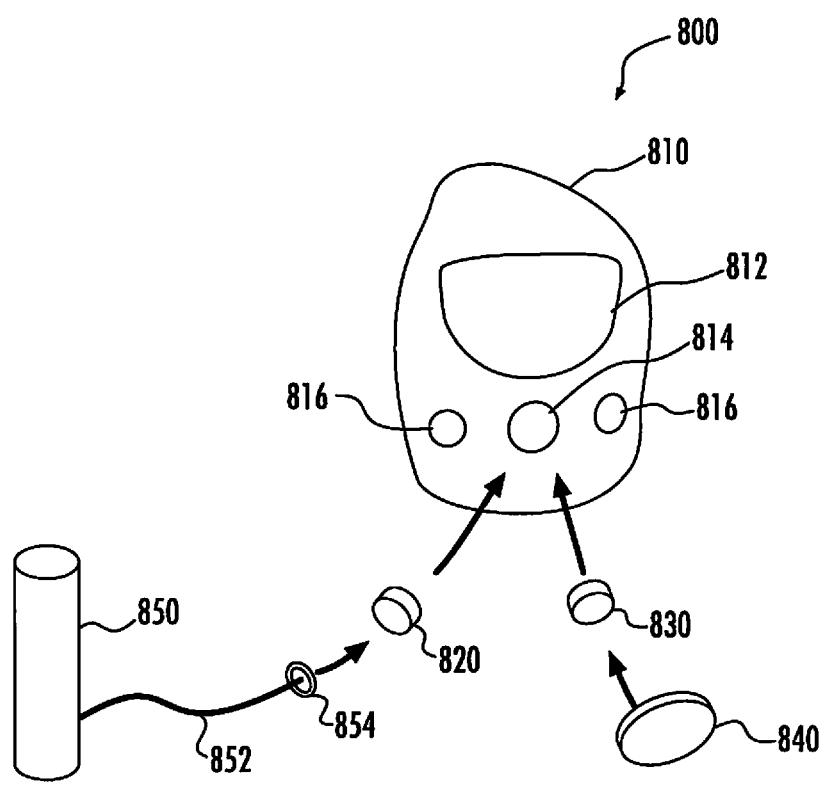
FIG. 8 is a schematic view of a respirator assembly formed in accordance with various embodiments.

FIG. 8 provides a perspective view of a respirator assembly 800. The respirator assembly 800 includes a mask 810, a first valve assembly 820, a second valve assembly 830, a filter 840, and an air supply 850. The mask 810 is configured to be worn or otherwise fit about the head of an operator. The first valve assembly 820 and the second valve assembly 830 are configured for interchangeable fitment to the mask 810, and are configured to be securable to the mask 810 in a sealed or air-tight fashion. The first valve assembly 820 and the second valve assembly 830 are configured to provide for the passage and control of air for both inhalation and exhalation, and may be configured generally similar to the valve assembly 100 discussed herein. In the illustrated embodiment, the first valve assembly 820 is configured for positive pressure operation, and the negative valve assembly 830 is configured for negative pressure operation. Air from outside the mask 810 is provided for inhalation to the operator via the first valve assembly 820 or the second valve assembly 830, and air exhaled by the operator is expelled from the operator via the first valve assembly 820 or the second valve assembly 830. In the illustrated embodiment, the respirator assembly 800 includes interchangeable valve assemblies for switching between positive and negative pressure operation. In alternate assemblies, a single valve assembly may be provided, with interchangeable caps and/or exhale valves for switching between positive and negative pressure operation. As further examples of possible configurations, in still other embodiments, the respirator assembly 800 may include a single valve assembly that is configured solely for positive pressure operation, or configured solely for negative pressure operation.

In the illustrated embodiment, the mask 810 includes a viewing window 812, a breathing port 814, and supplemental or additional ports 816. In the illustrated embodiment, the breathing port 814 is centrally positioned on the mask 810 and additional ports 816 are disposed on either side of the breathing port 814. Other numbers, types, or arrangements of ports may be employed in alternate embodiments. The breathing port 814 is configured to interchangeably accept the first valve assembly 820 or the second valve assembly 830, and to provide a sealed or air-tight securement of the first valve assembly 820 or the second valve assembly 830 to the mask 810. As the first valve assembly 820 and the second valve assembly 830 are configured to provide for both inhalation and exhalation, only one breathing port 814 is required in the illustrated embodiment, freeing up space for additional ports and/or providing for a larger field of view for a wearer of the mask 810. The additional ports 816 may be configured, for example, for mounting communication equipment or the like.

The depicted respirator assembly 800 includes a supply tank 850, a conduit 852, and a connection member 854. The supply tank 850 is configured to supply air for breathing to the mask 810 through the conduit 852. As indicated above, the first valve assembly 820 is configured for positive pressure operation, with air provided from a contained supply and maintained in the mask 810 at a positive pressure. For example, the supply end of the first valve assembly 820 may include a fitting configured to accept the connection member 854, and the exhale valve of the first valve assembly 820 may be configured to remain in a closed position when subjected to a pressure corresponding to the positive pressure to be maintained within the mask 810. For example, the exhale valve may be configured to open at a pressure that is intermediate between the positive pressure desired to be maintained within the mask 810 and an expected exhalation pressure. The conduit 852, for example, may be a hose. The connection member 854 is disposed proximate the end of the conduit 852 and configured to sealingly connect the supply tank 850 to the interior of the mask 810 (via the conduit 852 and the first valve assembly 820). The connection member 854 is configured to join the conduit 852 to the supply end of the first valve assembly 820. In various embodiments, the connection member 854 may include a demand valve for controlling the flow or provision of air from the supply tank 850 to the mask 810 through the first valve assembly 820.

The depicted respirator assembly also includes a filter canister 840. The filter canister 840 is configured to filter contaminants from the atmosphere from the environment to provide a purified air stream for inhalation to the mask 810 via the second valve assembly 830. As indicated above, the second valve assembly 830 is configured for negative pressure operation, with air drawn from the surrounding atmosphere by the inhalation of the wearer of the mask 810 through the filter canister 840. For example, the supply end of the second valve assembly 830 may include a fitting configured to accept the filter canister 840. Because the exhale valve of the second valve assembly 830 need not resist a positive pressure maintained within the mask, the exhale valve of the second valve assembly 830 may be biasable to the open position at a lower encountered pressure than the exhale valve of the first valve assembly 820, to reduce exhalation effort necessary to open the exhale valve of the second valve assembly 830.

Thus, various embodiments provide a valve assembly that includes a first passageway configured for inhalation and a second passageway configured for exhalation. The second passageway may be disposed peripherally around the first passageway, and/or at least a portion of the second passageway may laterally surround the first passageway. For example, the second passageway may include a ring shaped portion that encircles the first portion. Various embodiments provide for inhalation and exhalation via a single shared or common port of a mask or face piece. Further, various embodiments reduce the space occupied by components for inhalation and exhalation, and/or reduce the cost of parts, materials, manufacturing, assembly, maintenance, and/or repair of inhalation and exhalation valves. Various embodiments also improve visibility for respirator masks.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter described herein without departing from its scope. While the dimensions and types of materials described herein are intended to define the parameters of the subject matter described herein, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the subject matter described herein, including the best mode, and also to enable any person skilled in the art to practice the embodiments of the subject matter described herein, including making and using any devices or systems and performing any incorporated methods. The patentable scope of the subject matter described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A valve assembly configured for securement to a mask, the valve assembly having a mask end configured to be oriented toward the mask and a supply end configured to be oriented toward a supply of air, the valve assembly comprising:

a housing assembly defining a first air passageway and a second air passageway, the first air passageway configured for flow therethrough of air for inhalation, the second air passageway configured for flow therethrough of exhaled air, at least a portion of the second air passageway disposed peripherally around the first air passageway, the housing assembly including:
a housing;
a first cap; and
a second cap, the first cap and the second cap being interchangeable, the first cap being configured for use with positive pressure operation in which a positive pressure is maintained within the mask, and the second cap being configured for use with negative pressure operation in which a positive pressure is not maintained within the mask;
an inhale valve secured proximate to an interior portion of the housing assembly, the inhale valve being configured to be biased to an open position allowing flow through the first air passageway when subject to a reduction in pressure proximate the mask end of the valve assembly due to inhalation, and to be biased to a closed position inhibiting flow through the first air passageway when subject to an increase in pressure proximate the mask end of the valve assembly due to exhalation; and
an exhale valve secured peripherally around the interior portion of the housing assembly, the exhale valve being configured to be biased to a closed position inhibiting flow through the second air passageway when subject to a reduction in pressure proximate the mask end of the valve assembly due to inhalation, and to be biased to an open position allowing flow through the second air passageway when subject to an increase in pressure proximate the mask end of the valve assembly due to exhalation.

2. The valve assembly of claim 1, wherein the first air passageway and the second air passageway are concentrically disposed about a central axis, wherein the first air passageway and the second air passageway are co-axial.

3. The valve assembly of claim 2, wherein the first air passageway has a generally circular cross-section, and the second air passageway is generally annularly shaped, forming a ring that extends circumferentially around the first air passageway.

4. The valve assembly according to claim 3, wherein the inhale valve has a generally circular cross-section.

5. The valve assembly according to claim 4, wherein the exhale valve is configured as a truncated cone disposed around at least a portion of the housing assembly.

6. The valve assembly according to claim 1, wherein the exhale valve is interposed between the housing and one of the first cap and the second cap.

7. The valve assembly of claim 1, wherein the exhale valve is a first exhale valve composed of a resilient material having a first flexibility, the valve assembly further comprising a second exhale valve being composed of a resilient material having a second flexibility, the first exhale valve and the second exhale valve being interchangeable, the first exhale valve configured for use with positive pressure operation and the second exhale valve configured for use with negative pressure operation, the first flexibility being less than the second flexibility, wherein a greater biasing force is required to bias the first exhale valve than the second exhale valve.

8. The valve assembly according to claim 7, wherein the housing assembly includes a shelf disposed proximate the central portion and an inhale valve housing secured to the shelf, wherein the inhale valve is secured to the inhale valve housing with a pin.

9. The valve assembly of claim 8, wherein the inhale valve housing comprises a flange configured to accept the shelf, and wherein the shelf comprises a protrusion configured to cooperate with the flange to provide a seal.

10. A respiration assembly comprising:
a mask configured to be positioned about a head of an operator, the mask including a breathing port; and
a valve assembly configured for securement to the breathing port of the mask, the valve assembly having a mask end configured to be oriented toward the mask and a supply end configured to be oriented toward a supply of air, the valve assembly comprising:
a housing assembly defining a first air passageway and a second air passageway, the first air passageway being configured for flow therethrough of air for inhalation, the second air passageway being configured for flow therethrough of exhaled air, at least a portion of the second air passageway disposed peripherally around the first air passageway, the housing assembly including:
a housing;
a first cap; and
a second cap, the first cap and the second cap being interchangeable, the first cap being configured for use with positive pressure operation wherein a positive pressure is maintained within the mask, and the second cap being configured for use with negative pressure operation wherein a positive pressure is not maintained within the mask;
an inhale valve secured proximate to an interior portion of the housing assembly, the inhale valve being configured to be biased to an open position allowing flow through the first air passageway when subject to a reduction in pressure proximate the mask end of the valve assembly due to inhalation, and to be biased to a closed position inhibiting flow through the first air passageway when subject to an increase in pressure proximate the mask end of the valve assembly due to exhalation; and
an exhale valve secured peripherally around the interior portion of the housing assembly, the exhale valve being configured to be biased to a closed position inhibiting flow through the second air passageway when subject to a reduction in pressure proximate the mask end of the valve assembly due to inhalation, and to be biased to an open position allowing flow through the second air passageway when subject to an increase in pressure proximate the mask end of the valve assembly due to exhalation.

11. The assembly of claim 10, wherein the breathing port is disposed along a center of the mask.

12. The assembly of claim 11, wherein the mask further comprises additional ports configured to accept communication equipment.

13. The assembly according to claim 12, wherein the valve assembly is a first valve assembly, the respiration assembly further comprising a second valve assembly, each of the first and second valve assemblies being configured for mounting to the mask via the breathing port, the first valve assembly and the second valve assembly being interchangeable, the first valve assembly configured for positive pressure operation and the second valve assembly configured for negative pressure operation.

14. The assembly according to claim 13, wherein the first air passageway and the second air passageway are concentrically disposed about a central axis, wherein the first air passageway and the second air passageway are co-axial.

15. The assembly according to claim 14, wherein the first air passageway has a generally circular cross-section, and the second air passageway is generally annularly shaped, forming a ring that extends circumferentially around the first air passageway.

16. A valve assembly configured for securement to a mask, the valve assembly having a mask end configured to be oriented toward the mask and a supply end configured to be oriented toward a supply of air, the valve assembly comprising;
a housing assembly comprising:
a housing;
a cap securable to the housing, the cap being one of a first cap with a first fitment surface and a second cap with a second fitment surface, the first fitment surface and the second fitment surface being different, the first cap and the second cap being interchangeable, the first cap being configured for use with positive pressure operation in which a positive pressure is maintained within the mask and the second cap being configured for use with negative pressure operation in which a positive pressure is not maintained within the mask;
a first chamber disposed proximate the supply end of an interior of the housing assembly;
a second chamber disposed proximate the mask end of the interior of the housing; and
a third chamber disposed peripherally about at least one of at least a portion of the first chamber or at least a portion of the second chamber, the third chamber being between the housing and the cap, the third chamber in fluid communication with the second chamber;
an inhale valve interposed between the first chamber and the second chamber, the inhale valve configured to be biased to an open position allowing flow from the first chamber to the second chamber when subjected to a reduction in pressure proximate the mask end of the valve assembly due to inhalation, and to be biased to a closed position inhibiting flow from the second chamber to the first chamber when subjected to an increase in pressure proximate the mask end of the valve assembly due to exhalation; and
an exhale valve interposed between the third chamber and an exit region of the valve assembly, the exhale valve configured to be biased to a closed position inhibiting flow between the third chamber and the exit region when subject to a reduction in pressure proximate the mask end of the valve assembly due to inhalation, and to be biased to an open position allowing flow from the third chamber to the exit region when subject to an increase in pressure proximate the mask end of the valve assembly due to exhalation.

17. The valve assembly of claim 16, wherein the first chamber, second chamber, and third chamber are concentrically disposed about a central axis, wherein the first chamber, second chamber, and third chamber are co-axial.

18. The valve assembly of claim 17, wherein the first chamber and the second chamber are generally circular in cross-section, and wherein the third chamber is generally annularly shaped, forming a ring disposed radially outward from the first chamber and the second chamber.

19. The valve assembly according to claim 18, further comprising an inhale valve housing configured to support the inhale valve, wherein the housing includes a shelf interposed between the first chamber and the second chamber, the shelf configured to accept a flange of the inhale valve housing to secure the inhale valve housing to the housing, and wherein the exhale valve is configured as truncated cone disposed in the third chamber.

* * * * *